United States Patent
Kim et al.

(10) Patent No.: US 10,473,995 B2
(45) Date of Patent: Nov. 12, 2019

(54) REFLECTIVE LIQUID CRYSTAL DEVICE AND USE THEREOF

(71) Applicant: LG Chem, Ltd., Seoul (KR)

(72) Inventors: Jin Hong Kim, Daejeon (KR); Dong Hyun Oh, Daejeon (KR); Sung Joon Min, Daejeon (KR); Jung Sun You, Daejeon (KR); Jung Woon Kim, Daejeon (KR); Eun Jung Lim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/558,883

(22) PCT Filed: Mar. 28, 2016

(86) PCT No.: PCT/KR2016/003103
§ 371 (c)(1),
(2) Date: Sep. 15, 2017

(87) PCT Pub. No.: WO2016/159601
PCT Pub. Date: Oct. 6, 2016

(65) Prior Publication Data
US 2018/0067355 A1   Mar. 8, 2018

(30) Foreign Application Priority Data
Mar. 27, 2015 (KR) .................. 10-2015-0043092

(51) Int. Cl.
*G02F 1/137* (2006.01)
*C09K 19/02* (2006.01)
(Continued)

(52) U.S. Cl.
CPC .......... *G02F 1/13725* (2013.01); *C09K 19/02* (2013.01); *C09K 19/60* (2013.01);
(Continued)

(58) Field of Classification Search
CPC ................. G02F 1/13725; G02F 2001/133742
See application file for complete search history.

(56) References Cited

U.S. PATENT DOCUMENTS 5,926,242 A * 7/1999 Kataoka ............ G02F 1/133553
349/117
6,621,550 B1 * 9/2003 Arakawa ............. G02F 1/13725
349/113
(Continued)

FOREIGN PATENT DOCUMENTS

| JP | S57109234 A | 7/1982 |
| JP | S5915001 U | 1/1984 |

(Continued)

OTHER PUBLICATIONS

Search Report from International Application No. PCT/KR2016/003103, dated Jun. 23, 2016.
(Continued)

*Primary Examiner* — Dung T Nguyen
(74) *Attorney, Agent, or Firm* — Lerner, David, Littenberg, Krumholz & Mentlik, LLP

(57) ABSTRACT

A liquid crystal device and the use thereof are provided. The liquid crystal device has an advantage in terms of power consumption since a normally transparent mode may be realized in a state in which an external electric field is not applied, and can exhibit an excellent light blocking characteristic when an external electric field is applied.

10 Claims, 4 Drawing Sheets

(51) Int. Cl.
*G02F 1/1337* (2006.01)
*C09K 19/60* (2006.01)
*G02F 1/13363* (2006.01)
*C09K 19/38* (2006.01)
*G02F 1/1335* (2006.01)

(52) U.S. Cl.
CPC ........ *G02F 1/1337* (2013.01); *G02F 1/13363* (2013.01); *C09K 19/3852* (2013.01); *G02F 1/133553* (2013.01); *G02F 1/133784* (2013.01); *G02F 1/133788* (2013.01); *G02F 2001/13712* (2013.01); *G02F 2001/133567* (2013.01); *G02F 2001/133638* (2013.01); *G02F 2001/133742* (2013.01); *G02F 2001/133746* (2013.01); *G02F 2203/66* (2013.01); *G02F 2413/01* (2013.01); *G02F 2413/05* (2013.01); *G02F 2413/08* (2013.01)

(56) References Cited

U.S. PATENT DOCUMENTS

| | | | |
|---|---|---|---|
| 9,964,806 B2* | 5/2018 | Jang | G02F 1/133617 |
| 2002/0047965 A1 | 4/2002 | Suzuki et al. | |
| 2009/0185111 A1 | 7/2009 | Uesaka et al. | |
| 2015/0062498 A1 | 3/2015 | Jiang | |

FOREIGN PATENT DOCUMENTS

| | | |
|---|---|---|
| JP | H09297304 A | 11/1997 |
| JP | H10111513 A | 4/1998 |
| JP | H10292175 A | 11/1998 |
| JP | 2000194010 A | 7/2000 |
| JP | 2001100254 A | 4/2001 |
| JP | 2006151203 A | 6/2006 |
| JP | 2007199257 A | 8/2007 |
| JP | 2009177090 A | 8/2009 |
| JP | 4651791 B2 | 3/2011 |
| JP | 2012128000 A | 7/2012 |
| KR | 20080079564 A | 9/2008 |
| KR | 20110068336 A | 6/2011 |
| KR | 20150026427 A | 3/2015 |
| TW | 200732763 A | 9/2007 |

OTHER PUBLICATIONS

Search Report from Office Action from Taiwanese Application No. 105109644 dated Dec. 8, 2016.
Extended European Search Report including Written Opinion for Application No. EP16773382.3 dated Jul. 25, 2018.

* cited by examiner

REFLECTIVE LIQUID CRYSTAL DEVICE AND USE THEREOF

CROSS-REFERENCE TO RELATED APPLICATION

This application is a national phase entry under 35 U.S.C. § 371 of International Application No. PCT/KR2016/003103, filed Mar. 28, 2016, which claims priority to and the benefit of Korean Patent Application No. 10-2015-0043092, filed Mar. 27, 2015, the disclosures of which are incorporated herein by reference in their entirety.

TECHNICAL FIELD

The present invention relates to a reflective liquid crystal device, and the use thereof.

BACKGROUND ART

In display devices using guest-host liquid crystals, a dichroic dye serving as guest molecules may be mixed with host molecules of a liquid crystal layer, and the arrangement of the host and guest molecules is changed due to a voltage applied to liquid crystals, thereby causing a change in the light absorptivity of the liquid crystal layer.

For example, when a rod-shaped dichroic dye is used as the guest molecules, the dichroic dye has a property of being aligned parallel to the host molecules. Therefore, when an electric field is applied to change the alignment of the host molecules, an alignment direction of the dichroic dye may also be changed according to the host molecules.

There have been various attempts to use a reflective display device using such guest-host liquid crystals for reflective mirrors.

Such a reflective device is typically realized in a block mode (black mode) in a state in which an external electric field is not applied due to the arrangement of liquid crystals horizontally aligned in guest-host liquid crystals. In this case, the reflective device has a problem such as an increase in power consumption since an electric field is continuously applied to realize a transmission mode (white mode). Also, the reflective device has a problem in that haze occurs due to alignment of disordered liquid crystals when the alignment of the liquid crystals is changed from a horizontal alignment mode to a vertical alignment mode.

Prior-Art Document

[Patent Document] Korean Patent Unexamined Publication No. 2008-0079564

DETAILED DESCRIPTION OF THE INVENTION

Technical Problem

The present invention provides a reflective liquid crystal device, and the use thereof.

Also, the present invention provides a reflective liquid crystal device in a normally transparent mode in which a transmission mode (white mode) is realized in a state in which an external electric field is not applied, and the use thereof.

In addition, the present invention provides a reflective liquid crystal device capable of switching to an excellent light blocking characteristic in a block mode (black mode) when an external electric field is applied, and the use thereof.

Further, the present invention provides a reflective liquid crystal device which does not have a haze characteristic even when an external electric field is applied to realize a black mode, and the use thereof.

Technical Solution

Hereinafter, the present invention will be described in further detail.

The present invention is directed to a reflective liquid crystal device, and the use thereof.

The liquid crystal device according to one exemplary embodiment of the present invention has a reflection characteristic, and thus may be applied to various display devices using liquid crystals, for example, liquid crystal display devices, or may be applied to devices using liquid crystals, for example, rear-view or side-view mirrors for automobiles.

FIG. 1 is a schematic view showing a conventional reflective liquid crystal device known in the art. As sown in FIG. 1, the reflective liquid crystal device is configured to include a polarizing plate (100), a liquid crystal cell (200), and a reflective plate (300). The reflective liquid crystal device including such a polarizing plate has various problems in that the loss of reflectance and/or blocking rate by the polarizing plate may be caused, and it is unsuitable to manufacture thin liquid crystal devices since the liquid crystal devices become thicker.

Accordingly, when the polarizing plate is replaced with a guest-host liquid crystal cell, the reflective liquid crystal device according to one exemplary embodiment of the present invention may prevent the loss of light by the polarizing plate when the light is reflected, and prevent a decrease in a blocking rate caused due to polarization and absorption when the light is blocked.

Also, the reflective liquid crystal device using a guest-host liquid crystal layer is typically realized in a black mode in a state in which an external electric field is not applied due to the molecular arrangement of horizontally aligned liquid crystals. In this case, the reflective liquid crystal device has a problem in that, since a white mode is realized when an external electric field is applied, an electric field has to be continuously applied to realize the white mode.

However, since a guest-host liquid crystal layer including a liquid crystal compound which is vertically aligned to be pretilted at a predetermined angle by a pretilt homeotropic alignment film is used in the reflective liquid crystal device according to one exemplary embodiment of the present invention, a problem regarding power consumption in conventional reflective liquid crystal devices may be improved.

Also, the reflective liquid crystal device further includes a quarter-wave plate. Therefore, the present invention has an advantage of realizing a more excellent light blocking characteristic when an external electric field is applied to realize a black mode.

Also, in the present invention, the liquid crystal compound included in the guest-host liquid crystal layer is uniformly ordered in one direction. Therefore, a problem such as an increase in haze which may occur since the liquid crystal compound is randomly ordered when an external electric field is applied may be improved.

Such a reflective liquid crystal device according to one exemplary embodiment of the present invention includes a guest-host liquid crystal layer, a pretilt homeotropic alignment film, and a quarter-wave plate. Specifically, the reflective liquid crystal device according to one exemplary embodiment of the present invention includes a guest-host liquid crystal layer including a liquid crystal compound and a dichroic dye, a pretilt homeotropic alignment film(s) which exists on one or both surfaces of the guest-host liquid crystal layer, and a quarter-wave plate.

The liquid crystal device according to one exemplary embodiment of the present invention includes a guest-host liquid crystal layer. The guest-host liquid crystal layer according to one exemplary embodiment of the present invention may refer to a liquid crystal layer which is realized in a white mode or a black mode by mixing a dichroic dye serving as guest molecules with a liquid crystal compound serving as a host molecules, and changing an arrangement of the host molecules and the guest molecules using a voltage applied to liquid crystals.

Such a guest-host liquid crystal layer includes a liquid crystal compound and a dichroic dye. That is, the guest-host liquid crystal layer according to one exemplary embodiment of the present invention may be a layer formed by mixing the dichroic dye with the liquid crystal compound.

Specifically, the guest-host liquid crystal layer according to one exemplary embodiment of the present invention may include a liquid crystal compound aligned in one direction, and a dichroic dye aligned by the liquid crystal compound.

The dichroic dye included in the guest-host liquid crystal layer according to one exemplary embodiment of the present invention may be aligned by the liquid crystal compound to anisotropically absorb light incident on the liquid crystal layer, depending on whether or not a voltage is applied.

According to one exemplary embodiment, the guest-host liquid crystal layer of the present invention may, for example, absorb light parallel to an alignment direction of the dichroic dye molecules among non-polarized light incident on the guest-host liquid crystal layer, and may pass light perpendicular to the alignment direction of the dichroic dye molecules. In this process, the light passing through the guest-host liquid crystal layer may become unidirectionally polarized light.

In this case, since there is no polarizing plate as shown in FIG. 1, superior light transmission efficiency may be exhibited, and a decrease in thickness and cost may be achieved.

In the present invention, the term "dye" may refer to a material that can intensively absorb and/or transform light in at least some or all of a visible region, for example, a wavelength range of 400 nm to 800 nm, the term "dichroic dye" may refer to a material that may anisotropically absorb light in at least some or all of the visible region.

All types of dyes known to having the above-described characteristic and also have an ability to be aligned according to an alignment direction of the liquid crystal compound may, for example, be used as the dichroic dye.

According to one exemplary embodiment, the dichroic dye may be a dye having the maximum absorbance in the visible region, for example, 400 nm to 800 nm. In this case, a compound having a molecular backbone such as an azo-based compound, an anthraquinone-based compound, a phthalocyanine-based compound, an azomethine-based compound, an indigoid- or thioindigoid-based compound, a merocyanine-based compound, a 1,3-bis(dicyanomethylene)indan-based compound, an azulene-based compound, a quinophthalonic compound, a triphenodioxazine-based compound, an indolo[2,3,b]quinoxaline-based compound, an imidazo[1,2-b]-1,2,4 triazine-based compound, a tetrazine-based compound, a benzo-based compound, a naphthoquinone-based compound, or a combination thereof may be used.

According to one exemplary embodiment, the dichroic dye may be selected from compounds having a solubility parameter difference of less than approximately 7.4 (cal/cm$^3$)$^{1/2}$ with respect to the liquid crystal compound. The solubility parameter refers to a numerical value representing a degree of interaction between two or more compounds, indicating that a smaller solubility parameter difference between the compounds represents a stronger interaction and a larger solubility parameter difference between the compounds represents a weaker interaction.

The solubility parameter is related to a structure of the compound. Therefore, when the dichroic dye has a solubility parameter difference within this range, the interaction between the liquid crystal compound and the dichroic dye in the liquid crystal layer may be enhanced, thereby improving melt miscibility, preventing clumping of the dichroic dye itself, and improving dispersibility.

The dichroic dye may have a dichroic ratio of 1.5 to 14. Also, the dichroic ratio of the dichroic dye may be in a range of approximately 3 to 12. Also, the dichroic ratio of the dichroic dye may be in a range of approximately 5 to 10. Here, the dichroic ratio is a value obtained by dividing an absorbance of plane-polarized light in a direction parallel with the axis of the liquid crystal compound in the liquid crystal layer by an absorbance of polarized light in a direction perpendicular to the axis of the liquid crystal compound. In this case, the dichroic ratio may represent a degree of the dichroic dye arranged side by side in one direction. When the dichroic dye has a dichroic ratio in the above range, melt mixing may be realized since the dichroic dye may have sufficient compatibility with the liquid crystal compound, and a polarization characteristic may be improved since an alignment of the dichroic dye may be induced according to an alignment of the liquid crystal compound.

The dichroic dye may be included in the liquid crystal layer in a proper content range. Reflectance and a blocking rate of the liquid crystal layer may vary according to the content of the dichroic dye. In the present invention, the content of the dichroic dye may be adjusted in consideration of desired ranges of the reflectance and the blocking rate.

According to one exemplary embodiment, the guest-host liquid crystal layer may include the dichroic dye at a content of 0.3 to 3 parts by weight, based on 100 parts by weight of the liquid crystal compound. Within this content range, the desired ranges of the reflectance and the blocking rate may be achieved in the liquid crystal device according to one exemplary embodiment of the present invention.

According to another exemplary embodiment, the dichroic dye may be included in the guest-host liquid crystal layer at a content of 0.4 to 2.8 parts by weight, 0.5 to 2.5 parts by weight, or 0.8 to 2 parts by weight, based on 100 parts by weight of the liquid crystal compound.

The guest-host liquid crystal layer according to one exemplary embodiment of the present invention includes a liquid crystal compound.

Liquid crystals in the liquid crystal compound may be mainly divided into thermotropic liquid crystals and lyotropic liquid crystals. In this case, the thermotropic liquid crystals may refer to types of liquid crystals whose molecular structure is modified only by heat, and the lyotropic liquid crystals may refer to liquid crystals having a property in which a molecular structure is modified by factors other than the heat. The thermotropic liquid crystals may be referred to as temperature-transition-type liquid crystals, and the lyotropic liquid crystals may be referred to as concentration-transition-type liquid crystals.

That is, the liquid crystal compound included in the liquid crystal cell according to one exemplary embodiment of the present invention may be a temperature-transition-type liquid crystal compound or a concentration-transition-type liquid crystal compound.

The temperature-transition-type liquid crystal compound or the concentration-transition-type liquid crystal compound may be divided into a rod-shaped liquid crystal compound or a discotic liquid crystal compound, depending on a shape thereof. Also, the temperature-transition-type liquid crystal compound or the concentration-transition-type liquid crystal compound may be divided into a smectic, nematic or cholesteric liquid crystal compound, depending on a difference in arrangement methods.

According to one exemplary embodiment, the liquid crystal compound included in the liquid crystal layer according to one exemplary embodiment of the present invention may be a nematic liquid crystal compound.

For example, the nematic liquid crystal compound included in the liquid crystal layer may have a difference ($\Delta n = Ne - No$) between an extraordinary refractive index (Ne) and an ordinary refractive index (No) at a wavelength of 550 nm in a range of approximately 0.05 to 3, approximately 0.05 to 2.5, approximately 0.05 to 2, approximately 0.05 to 1.5, or approximately 0.07 to 1.5.

Also, the nematic liquid crystal compound may be a compound generally referred to as an N-type liquid crystal compound in the related art in which a difference ($\Delta\varepsilon = \varepsilon_e - \varepsilon_o$) between an extraordinary dielectric anisotropy ($\varepsilon_e$) and an ordinary dielectric anisotropy ($\varepsilon_o$) represents a negative value.

According to one exemplary embodiment, the liquid crystal compound included in the liquid crystal layer according to one exemplary embodiment of the present invention may be an N-type nematic liquid crystal compound.

Specifically, the nematic liquid crystal compound may have a difference ($\Delta\varepsilon = \varepsilon_e - \varepsilon_o$) between the extraordinary dielectric anisotropy ($\varepsilon_e$) and the ordinary dielectric anisotropy ($\varepsilon_o$) of approximately −40 or more, approximately −35 or more, approximately −30 or more, or approximately −25 or more. Also, an upper limit of the difference ($\Delta\varepsilon = \varepsilon_e - \varepsilon_o$) in the dielectric anisotropy is not particularly limited, and may be less than or equal to approximately −15, approximately −10, approximately −8, approximately −6, approximately −4, approximately −3.5, or approximately −3. The range of the dielectric anisotropy of the liquid crystal compound is not particularly limited as long as the difference ($\Delta\varepsilon = \varepsilon_e - \varepsilon_o$) described above is exhibited. For example, the extraordinary dielectric anisotropy ($\varepsilon_e$) may be in a range of approximately 1 to 5, and the ordinary dielectric anisotropy ($\varepsilon_o$) may be in a range of approximately 4 to 40.

The liquid crystal layer according to one exemplary embodiment of the present invention may be formed on an alignment film to be described below: by mixing the above-described liquid crystal compound used as host molecules and the dichroic dye used as guest molecules, a guest-host liquid crystal layer including the liquid crystal compound aligned in a predetermined direction and the dichroic dye, may be formed.

Specifically, a method of forming the guest-host liquid crystal layer according to one exemplary embodiment of the present invention may be, for example, carried out by properly mixing other additives with a liquid crystal compound and a dichroic dye, which are included at a predetermined content for the liquid crystal compound, to prepare a composition for forming a liquid crystal layer, and injecting the composition for forming a liquid crystal layer between substrate layers which are disposed to be spaced apart from each other and having an alignment film and a transparent electrode formed thereon, and then properly applying heat or light to the composition, but the present invention is not limited thereto.

The liquid crystal compound included in the guest-host liquid crystal layer formed by the method may be aligned in a predetermined direction by the pretilt homeotropic alignment film.

According to one exemplary embodiment, the liquid crystal compound included in the guest-host liquid crystal layer according to one exemplary embodiment of the present invention may be aligned by the pretilt homeotropic alignment film to be pretilted at a predetermined angle with respect to a surface of the substrate layer on the liquid crystal layer. Vertically aligning the liquid crystal compound to be pretilted may refer to a state in which the liquid crystal compound in the liquid crystal layer is aligned so that an optical axis of the liquid crystal compound is formed at a predetermined angle, for example, an angle of 70° to 90°, with respect to a surface of the guest-host liquid crystal layer. The optical axis may refer to a slow axis or a fast axis, and may preferably refer to a slow axis.

Specifically, a pretilt angle of the liquid crystal compound included in the guest-host liquid crystal layer may be in a range of 70° to 90° in a state in which an external electric field is not applied.

As described above, when the liquid crystal layer including the liquid crystal compound vertically aligned to be pretilted is used as the guest-host liquid crystal layer, a liquid crystal device in a normally transparent mode may be provided. In this case, the occurrence of haze may be prevented since liquid crystal compounds are randomly aligned when a voltage is applied.

According to another exemplary embodiment, the pretilt angle of the liquid crystal compound included in the guest-host liquid crystal layer may be in a range of 75° to 88°, or 78° to 85°.

The guest-host liquid crystal layer may, for example, have a thickness ranging from 3 µm to 30 µm. Within this thickness range, a thin liquid crystal device may be manufactured, a desired light blocking rate and reflectance may be realized, problems regarding a decrease in quality due to a viewing angle may be overcome, and a contrast ratio may be improved. According to another exemplary embodiment, the thickness of the liquid crystal layer may be in a range of 5 µm to 25 µm, or 8 µm to 20 µm.

The reflective liquid crystal device according to one exemplary embodiment of the present invention includes a pretilt homeotropic alignment film. The pretilt homeotropic alignment film may exist on one or both surfaces of the guest-host liquid crystal layer to align the liquid crystal compound in the guest-host liquid crystal layer, and may, for example, be present on both surfaces of the guest-host liquid crystal layer.

The pretilt homeotropic alignment film may vertically align the guest-host liquid crystal layer to be pretilted, and may prevent the liquid crystal compound from being randomly arranged when a voltage is applied.

According to one exemplary embodiment, the pretilt homeotropic alignment film of the present invention may have a pretilt angle of 70° to 90°. The pretilt angle may refer to an angle formed between a surface normal perpendicular to a plane of an alignment film and an optical axis direction of a compound, for example, liquid crystal compound, included in the alignment film. According to another exemplary embodiment, the pretilt homeotropic alignment film may have a pretilt angle of 75° to 88°, or 78° to 85°.

The pretilt homeotropic alignment film according to one exemplary embodiment of the present invention may, for example, be an optical alignment film or a rubbing alignment film.

According to one exemplary embodiment, the pretilt homeotropic alignment film may be formed by forming a homeotropic alignment film using a composition for forming a homeotropic alignment film, for example, an photo-alignable compound containing a vertically alignable polar functional group, and then performing a rubbing process of imparting a predetermined pretilt angle to the homeotropic alignment film, but the present invention is not limited thereto.

The photo-alignable compound may refer to a compound which is alignmentally ordered in a predetermined direction by irradiation with light, and can align adjacent liquid crystal compounds in a predetermined direction through an interaction such as anisotropic interaction when the liquid crystal compounds are alignmentally ordered.

Specifically, the alignment film may include a photo-alignable compound. The photo-alignable compound may, for example, be a single-molecule compound, a monomeric compound, an oligomeric compound, or a polymeric compound. Also, the photo-alignable compound may be a compound containing a photosensitive moiety.

For example, the photo-alignable compound that may be used herein may include a compound alignmentally ordered by trans-cis photoisomerization; a compound alignmentally ordered by photo-destruction such as chain scission or photo-oxidation; a compound alignmentally ordered by photo-crosslinking or photo-polymerization such as [2+2] cycloaddition, [4+4] cycloaddition or photodimerization; a compound alignmentally ordered by photo-Fries rearrangement; or a compound alignmentally ordered by a ring opening/closure reaction.

Examples of the compound alignmentally ordered by the trans-cis photoisomerization may, for example, include an azo compound such as a sulfonated diazo dye or an azo polymer, or a stilbene compound.

Examples of the compound alignmentally ordered by the photo-destruction may include cyclobutane-1,2,3,4-tetracarboxylic dianhydride, an aromatic polysilane or polyester, polystyrene, or a polyimide.

Examples of the compound alignmentally ordered by the photo-crosslinking or photo-polymerization may include a cinnamate compound, a coumarin compound, a cinnamamide compound, a tetrahydrophthalimide compound, a maleimide compound, a benzophenone compound, a diphenylacetylene compound, a compound (hereinafter, referred to as a "chalcone compound") containing a chalconyl moiety as a photosensitive moiety, or a compound (hereinafter, referred to as a "anthracenyl compound") containing an anthracenyl moiety.

Also, the photo-alignable compound may be a single-molecule compound, a monomeric compound, an oligomeric compound or a polymeric compound, or may be in the form of a blend of the photo-alignable compound and a polymer. As such, the oligomeric or polymeric compound may have the above-described photosensitive moiety or a moiety derived from the above-described photo-alignable compound. In this case, these moieties may be present in the main chain or the side chain of the oligomeric or polymeric compound.

Examples of the polymer which has the photo-alignable compound-derived moiety or photosensitive moiety or may be mixed with the photo-alignable compound may include polynorbornenes, polyolefins, polyarylates, polyacrylates, poly(meth)acrylates, polyimides, poly(amic acid), polymaleimides, polyacrylamides, poly(meth)acrylamides, polyvinyl ethers, polyvinyl estesr, polystyrene, polysiloxanes, polyacrylonitriles, or poly(meth)acrylonitriles, but the present invention is not limited thereto.

Representative examples of the polymer that may be included in the alignable compound may include polynorbornene cinnamate, polynorbornene alkoxy cinnamate, polynorbornene allyloyloxy cinnamate, polynorbornene-fluorinated cinnamate, polynorbornene-chlorinated cinnamate, or polynorbornene dicinnamate, but the present invention is not limited thereto.

When the alignable compound is a polymeric compound, the compound has a number average molecular weight of, for example, approximately 10,000 g/mol to 500,000 g/mol, but the present invention is not limited thereto.

The photo-alignable compound may include a vertically alignable polar functional group to impart a vertical alignment characteristic to the alignment film. All types of functional groups capable of imparting a vertical alignment force, by which the liquid crystal compound can be vertically aligned through the interaction with the liquid crystal compound, to the alignment film may, for example, be included in the scope of the term "vertically alignable polar functional group." Examples of such a functional group may include an acryloyl group, or a (meth)acryloyl group.

As such, when the vertically aligned alignment film is formed using the photo-alignable compound containing the vertically alignable polar functional group, and then subjected to a rubbing process, a pretilt angle may be imparted to the homeotropic alignment film. The rubbing process may include a process of rubbing the homeotropic alignment film with fibrous cloth, etc.

According to one exemplary embodiment, when the reflective liquid crystal device of the present invention includes a pair of pretilt homeotropic alignment films, the rubbing process may be performed by crossing the pair of alignment films in a rubbing direction. As such, the liquid crystal compound in the liquid crystal layer between the pair of alignment films may be alignmentally ordered in one direction by crossing the pair of alignment films in a rubbing direction, and the occurrence of haze caused due to an alignmental order of liquid crystals being disturbed when a voltage is applied may be reduced.

The liquid crystal device according to one exemplary embodiment of the present invention includes a quarter-wave plate. The quarter-wave plate according to one exemplary embodiment of the present invention refers to an optically anisotropic layer which left-circularly or right-circularly polarizes linearly polarized light, or linearly polarizes left- or right-circularly polarized light.

According to one exemplary embodiment, the quarter-wave plate of the present invention may include a coating layer including a liquid crystal compound, and a polymeric film having optical anisotropy, or may have a stacked structure of the polymeric film and the coating layer including the liquid crystal compound.

The liquid crystal compound may, for example, be formed by polymerizing a reactive mesogen. In the present invention, the term "reactive mesogen" may refer to a mesogen containing a reactive group that can induce polymerization upon application of light or heat, for example, a polymerizable functional group. In the present invention, the term "mesogen" may refer to a meso-phase compound that enables layers to express liquid crystal behavior when a polymerizable liquid crystal compound such as the reactive mesogen is polymerized to form the layers.

The reactive mesogen included in the quarter-wave plate may, for example, be a mesogen containing two or three or more polymerizable functional groups, and may, for example, have a structure represented by the following Expression 1 or 2.

P-Sp-A-Sp-P   [Expression 1]

P-A-Sp-A-P   [Expression 2]

In Expressions 1 and 2, P may represent a polymerizable functional group, A may represent a mesogenic group, and Sp may represent a connecting group. In the present invention, the term "connecting group" may refer to a group that serves to connect the mesogenic group to the polymerizable functional group and serves to give flexibility to an optically anisotropic layer when the liquid crystal compound is polymerized to form the optically anisotropic layer.

One example of the polymerizable functional group may include a (meth)acrylate, a (meth)acrylamide, an acrylonitrile, a styrene, an alkyl group, a cyano group, an alkoxy group, or a vinyl group, but the present invention is not limited thereto. For example, functional groups which are reactive to heat or light that may be used to induce polymerization of the liquid crystal compound may be used without limitation. In the present invention, the term "(meth) acrylate" may refer to an acrylate or a methacrylate. In the present invention, the term "(meth)acrylamide" may refer to an acrylamide or a methacrylamide.

The mesogenic group may be a calamitic mesogenic group or a discotic mesogenic group.

The calamitic mesogenic group may refer to a mesogenic group that is in a rod shape in which one or more aromatic or aliphatic rings are connected in one direction, and thus may be polymerized to form a rod-shaped liquid crystal structure. Also, the calamitic mesogenic group may include one or more functional groups at ends or sides of the rod shape.

One example of the calamitic mesogenic group may be represented by the following Expression 3.

$-(A^2-Z)_n-A^3-$   [Expression 3]

In Expression 3, $A^2$ and $A^3$ may each independently represent an aromatic or aliphatic cyclic group which includes or does not include heteroatoms selected from nitrogen, oxygen or sulfur atoms, Z may represent —O—, —S—, —CO—, —COO—, OCO—, —S—CO—, —CO—S—, —O—COO—, —CO—NR$^O$—, —NR$^O$—CO—, —NR$^O$—CO—NR$^{OO}$, —NR$^O$—CO—O—, —O—CO—NR$^O$, —OCH$_2$—, —CH$_2$O—, —SCH$_2$—, —CH$_2$S—, CF$_2$O—, OCF$_2$—, —CF$_2$S—, —SCF$_2$—, —CH$_2$CH$_2$—, —(CH$_2$)$_4$—, —CF$_2$CH$_2$—, —CH$_2$CHF$_2$—, —CH═N—, —N═CH—, —N═N—, —CH═CR$^O$—, —CY$^1$═CY$^2$—, —C≡C—, —CH═CH—COO—, —OCO—CH═CH—, or a single bond, R$^O$ and R$^{OO}$ may each independently represent hydrogen or an alkyl group having 1 to 12 carbon atoms, Y$^1$ and Y$^2$ may each independently represent hydrogen, fluorine, chlorine, or cyanide, and n may be an integer ranging from 1 to 4.

The discotic mesogenic group may refer to a mesogenic group which has a planar core structure including one or more aromatic or aliphatic rings, and thus may be polymerized to form a discotic liquid crystal structure, and may, for example, include triphenylene, etc., but the present invention is not limited thereto.

In the present invention, the connecting group included in Expressions 1 and 2 may, for example, be in the form of -(A$^4$-B)$_m$— where A$^4$ may be a linear or branched alkylene group having 1 to 12 carbon atoms, B may be oxygen or sulfur, and m may be an integer ranging from 1 to 5.

When the quarter-wave plate of the present invention is a polymeric film, types of the polymeric film may be used without limitation as long as they can impart optical anisotropy to the polymer. According to one exemplary embodiment, examples of the polymeric film may include a polyolefin such as a polyethylene, a polypropylene, or a norbornene-based polymer, a polyvinyl alcohol, a polymethacrylic ester, a polyacrylic ester, or a cellulose ester. Also, a copolymer of the polymers, or a mixture of the polymers may be used as the polymeric film.

When the optically anisotropic layer is a polymeric film, the optical anisotropy of the polymeric film may be obtained by elongation. The elongation may be uniaxial or biaxial elongation.

According to one exemplary embodiment, the uniaxial elongation performed to impart optical anisotropy to the polymeric film may be uniaxial horizontal extension using a difference in speed of two or more rolls, or tenter elongation by which a polymeric film is elongated in a width direction by pulling both ends of the polymeric film.

The quarter-wave plate according to one exemplary embodiment of the present invention may serve to effectively realize a black mode in which the guest-host liquid crystal layer has a reflectance of 15% or less when light is shut off by applying an external electric field to the reflective liquid crystal device to horizontally align the liquid crystal compound included in the guest-host liquid crystal layer.

The optical axis of the quarter-wave plate may form an angle of 40° to 50° with respect to the optical axis of the liquid crystal compound included in the horizontally aligned guest-host liquid crystal layer when an external electric field is applied. Within this angle range, a quarter-wave plate having a desired linearly and circularly polarized light switching characteristic may be realized, and an excellent light blocking characteristic of the reflective liquid crystal device may be exhibited. As such, the optical axis of the quarter-wave plate may, for example, refer to an optical axis of the liquid crystal compound when the quarter-wave plate is a coating layer including the liquid crystal compound.

According to another exemplary embodiment, the optical axis of the quarter-wave plate may form an angle of 42° to 48°, 43° to 47°, 44° to 46°, or approximately 45° with respect to the optical axis of the liquid crystal compound included in the horizontally aligned guest-host liquid crystal layer when an external electric field is applied.

When the quarter-wave plate is a coating layer, one example of a method of preparing the coating layer may include a process of coating any substrate with a mixture including a reactive mesogen, an initiator and other additives using a known coating method and then curing the mixture, but the present invention is not limited thereto. When the quarter-wave plate is a polymeric film, one example of a method of preparing the polymeric film may include a solvent casting method, etc., but the present invention is not limited thereto. For example, various known preparation methods may be used without limitation.

The reflective liquid crystal device according to one exemplary embodiment of the present invention may further include a substrate layer(s) formed at one or both surfaces of the guest-host liquid crystal layer.

According to one exemplary embodiment, the reflective liquid crystal device of the present invention may include a pair of substrate layers, and may have a structure in which a guest-host liquid crystal layer and an alignment film may be included between the substrate layers.

Specifically, the reflective liquid crystal device according to one exemplary embodiment of the present invention may include a guest-host liquid crystal layer 600 present between a pair of substrate layers 401a and 401b, as shown in FIG. 2, and may have a structure including a quarter-wave plate 700 positioned on an opposite surface of a surface of the substrate layer 401b of the pair of substrate layers 401a and 401b at which the guest-host liquid crystal layer exists. In this case, the reflective liquid crystal device may further have a structure including a pair of alignment films 500 and a pair of electrode layers 402, which are sequentially formed on both surfaces of the guest-host liquid crystal layer 600 between the pair of substrate layers 401a and 401b.

According to another exemplary embodiment, the reflective liquid crystal device of the present invention may have a structure including a substrate layer 401a, and a guest-host liquid crystal layer 600 and a quarter-wave plate 700 formed on the substrate layer 401a, as shown in FIG. 3. In this case, the reflective liquid crystal device may further have a structure including a pair of alignment films 500 and a pair of electrode layers 402, which are sequentially formed on both surfaces of the guest-host liquid crystal layer 600.

Known materials may be used as the substrate layer without limitation. For example, an inorganic film such as a glass film, a crystalline or amorphous silicon film, or a quartz film; or a plastic film may be used as the substrate layer.

Also, an optically isotropic substrate layer, or an optically anisotropic substrate layer such as a retardation layer may be used as the substrate layer.

According to one exemplary embodiment, the plastic substrate layer that may be used herein may include at least one selected from the group consisting of triacetyl cellulose, a cyclic olefin copolymer, polymethyl(meth)acrylate, polycarbonate, polyethylene terephthalate, a polyimide, a polyarylate, a polysulfone, and an amorphous fluorine resin, but the present invention is not limited thereto. The substrate layer may also include a coating layer formed of gold, silver, or a silicon compound such as silicon dioxide or silicon monoxide, or a coating layer such as an anti-reflection layer, as necessary.

The reflective liquid crystal device according to one exemplary embodiment of the present invention may further include a pair of electrode layers configured to change the alignment of the liquid crystal compound included in the guest-host liquid crystal layer.

That is, as shown in FIG. 2, the reflective liquid crystal device according to one exemplary embodiment of the present invention may include a guest-host liquid crystal layer 600 between the pair of substrate layers 401a and 401b, and a pair of alignment films 500 and a pair of electrode layers 402, which are sequentially formed on both surfaces of the guest-host liquid crystal layer 600, and may have a structure including a quarter-wave plate 700 positioned on an opposite surface of a surface of the substrate layer 401b of the pair of substrate layers 401a and 401b at which the guest-host liquid crystal layer 600 exists.

The electrode layer may, for example, include transparent electrodes. The transparent electrodes may, for example, formed by depositing a conductive polymer, a conductive metal, conductive nanowires, or a metal oxide such as indium tin oxide (ITO).

One of the transparent electrodes may have a pattern formed to prevent a phenomenon in which an external object is reflected in a reflective plate. According to one exemplary embodiment, one of the transparent electrodes positioned close to the reflective plate among the transparent electrodes may be patterned.

The electrode layer may, for example, have a thickness ranging from 50 μm to 200 μm. The thickness of the electrode layer may be properly adjusted in consideration of a thickness of the guest-host liquid crystal layer as will be described below.

In the reflective liquid crystal device according to one exemplary embodiment of the present invention, ranges of the thicknesses of the liquid crystal layer, the substrate layer and the electrode layer may, for example, be set to satisfy the following Equation 1.

$$0.015 < b/a < 0.6 \quad \text{[Equation 1]}$$

In Equation 1, b represents a thickness of the guest-host liquid crystal layer, and a represents the sum of thicknesses of the substrate layer and the electrode layer.

Since the thickness ranges are set to satisfy Equation 1 in the guest-host liquid crystal layer according to one exemplary embodiment of the present invention, problems regarding a decrease in quality due to a viewing angle may be overcome, a contrast ratio may be improved, and a desired reflectance and transmittance may be achieved. In the case of other numerical value ranges in Equation 1, the ranges of thicknesses of the substrate layer and the electrode layer and the thickness of the guest-host liquid crystal layer may, for example, be adjusted so that the b/a in Equation 1 is in a range of 0.02 to 0.5, or 0.04 to 0.4, but the present invention is not limited thereto.

The reflective liquid crystal device according to one exemplary embodiment of the present invention may further include a reflective plate. Also, the reflective plate may be positioned on an opposite surface of a surface of the quarter-wave plate at which the guest-host liquid crystal layer exists.

Specifically, when the reflective liquid crystal device according to one exemplary embodiment of the present invention has a structure including a pair of substrate layers, such a reflective liquid crystal device may include a pair of alignment films 500, a pair of electrode layers 402 and a pair of substrate layers 401a and 401b, which are sequentially formed on both surfaces of the guest-host liquid crystal layer 600, as shown in FIG. 2, and may have a structure including a quarter-wave plate 700 and a reflective plate 300, which are sequentially positioned on an opposite surface of a surface of the substrate layer 401b among the pair of substrate layers 401a and 401b at which the guest-host liquid crystal layer 600 exists. In this case, the substrate layer 401b is disposed at a far-off position in a direction in which light is incident. Owing to such structure, the desired reflective liquid crystal device may be realized.

The reflective liquid crystal device according to one exemplary embodiment of the present invention may be realized in a normally transparent mode in a state in which an external electric field is not applied as described above.

In the present invention, the term "normally transparent mode" refers to a mode in which a liquid crystal device has a reflectance of 30% or more in a state in which an external electric field is not applied. The reflectances of samples to the reflectance of the reflective plate may, for example, be measured under a D65 light source using a spectrum colorimeter (CM-2500d commercially available from Konica Minolta Co., Ltd.).

That is, the reflective liquid crystal device according to one exemplary embodiment of the present invention may be maintained in a white mode such that the reflective liquid crystal device has a reflectance of 30% or more in a state in which the external electric field is not applied. According to another exemplary embodiment, the reflective liquid crystal device of the present invention may be maintained in a white mode such that the reflective liquid crystal device has a reflectance of 40% or more, 50% or more, or 60% or more in a state in which an external electric field is not applied.

When an external electric field is applied to the electrode layer included in the reflective liquid crystal device according to one exemplary embodiment of the present invention, the alignment of the liquid crystal compound included in the guest-host liquid crystal layer may be changed, and thus the reflectance of the liquid crystal device may vary.

According to one exemplary embodiment, the reflective liquid crystal device of the present invention may satisfy the following Equation 2.

$$A-B>40\%$$ [Equation 2]

In Equation 2, A represents a reflectance in a state in which an external electric field is not applied, and B represents a reflectance in a state in which an external electric field is applied.

That is, the reflective liquid crystal device according to one exemplary embodiment of the present invention may have a difference in reflectance exceeding approximately 40%, depending on whether or not an external electric field is applied. According to another exemplary embodiment, the difference in reflectance may be greater than 41%, greater than 42%, greater than 43%, greater than 44%, or greater than 45%.

As such, the reflective liquid crystal device may be switched between a white mode and a black mode, depending on whether or not an external electric field is applied.

According to one exemplary embodiment, the reflective liquid crystal device of the present invention may be maintained in a black mode in a state in which an external electric field is applied.

In the present invention, the term "black mode" refers to a mode in which the liquid crystal device has a reflectance of less than 30%.

According to one exemplary embodiment, the reflective liquid crystal device may be maintained in a black mode such that the reflective liquid crystal device has a reflectance of 25% or less in a state in which an external electric field is applied. According to another exemplary embodiment, the reflective liquid crystal device may be maintained in a black mode such that the reflective liquid crystal device has a reflectance of 20% or less, 15% or less, 14% or less, or 13% or less in a state in which an external electric field is applied.

Owing to the arrangement of the liquid crystal compound in the liquid crystal layer alignmentally ordered in one direction, the reflective liquid crystal device according to one exemplary embodiment of the present invention may be realized in a transparent mode such that the reflective liquid crystal device has a low haze value even when the black mode is realized when an external electric field is applied.

According to one exemplary embodiment, the reflective liquid crystal device of the present invention may be maintained in a transparent mode in a state in which an external electric field is applied.

In the present invention, the term "transparent mode" refers to a state of a liquid crystal device whose haze is less than 10%. That is, the reflective liquid crystal device may be maintained in a transparent mode such the reflective liquid crystal device has a haze value of less than 10%.

That is, the reflective liquid crystal device according to one exemplary embodiment of the present invention may be realized at the same time in a black mode such that the reflective liquid crystal device has a reflectance of less than 30% and in a transparent mode such that that the reflective liquid crystal device has a haze value of less than 10% in a state in which an external electric field is applied. As such, the reflective liquid crystal device according to one exemplary embodiment of the present invention may be driven in a black mode and a transparent mode at the same time due to the liquid crystal compound in the liquid crystal layer alignmentally ordered in one direction in a state in which an external electric field is applied.

Hereinafter, an operation principle of the liquid crystal device including the reflective plate will be described.

A liquid crystal compound 601 in a guest-host liquid crystal layer 600 of the reflective liquid crystal device according to one exemplary embodiment of the present invention is vertically aligned to be pretilted so that the liquid crystal layer 600 has a pretilt angle of 70° to 90° when an electric field is not applied, and a dichroic dye 602 is aligned according to the alignment of the liquid crystal compound 601, as shown in FIG. 4. In this case, light 800 incident on a lower substrate passes through the vertically aligned liquid crystal layer 600 in a non-polarized state, and non-polarized light passing through the liquid crystal layer 600 also passes through a quarter-wave plate 700 in a non-polarized state. Thereafter, the non-polarized light is reflected by the reflective plate 300, and the reflected light is again emitted through the quarter-wave plate 700 and the liquid crystal layer 600. Therefore, the reflective liquid crystal device may be generally realized in a transparent mode.

Meanwhile, as shown in FIG. 5, the liquid crystal compound 601 in the liquid crystal layer 600 is horizontally aligned in a direction in which the liquid crystal layer 600 is aligned to be pretilted when an electric field is applied, and the dichroic dye 602 is aligned according to the alignment of the liquid crystal compound 601. In this case, among light 800 incident on a lower substrate, light 801 parallel with an alignment direction of the dichroic dye 602 is absorbed, and light 802 perpendicular to the alignment direction of the dichroic dye 602 passes through the liquid crystal layer 600. The linearly polarized light passing through the liquid crystal layer 600 is circularly polarized by the quarter-wave plate 700, reflected by the reflective plate 300, and then circularly polarized in a reverse direction. As the reversely circularly polarized light again passes through the quarter-wave plate 700, the reversely circularly polarized light is linearly polarized in a direction parallel with the alignment direction of the dichroic dye 602, and thus absorbed by the dichroic dye 602. As a result, since the incident light is not emitted, the reflective liquid crystal device may be realized in a black mode.

When the reflective liquid crystal device according to one exemplary embodiment of the present invention is applied to reflective liquid crystal display devices, a normally transparent mode may be realized, based on the above-described operation principle.

Further, the present invention is directed to a mirror including the reflective liquid crystal device. The mirror may be used as a side-view mirror which can be replaced with a rear-view mirror or electronic chromic mirror (ECM) for automobiles, but the present invention is not limited thereto.

Effect of the Invention

The present invention can provide a reflective liquid crystal device in a normally transparent mode in which a white mode is realized in a state in which an external electric field is not applied, and the use thereof.

Also, the present invention can provide a reflective liquid crystal device capable of switching to an excellent light blocking characteristic in a black mode when an external electric field is applied, and the use thereof.

Further, the present invention can provide a reflective liquid crystal device which does not have a haze characteristic even when an external electric field is applied to realize a black mode, and the use thereof.

DESCRIPTION OF DRAWING NUMBER

Figure 1:
FIG. 1 is a schematic view showing a conventional reflective liquid crystal device.

100: a polarizing plate
200: a liquid crystal cell
300: a reflective plate
401a, 401b: substrate layers
402: electrode layers
500: alignment films
600: a guest-host liquid crystal layer
700: a quarter-wave plate
800: light incident on a lower substrate
801: light parallel with an alignment direction of a dichroic dye
802: light perpendicular to an alignment direction of a dichroic dye

BEST MODE FOR CARRYING OUT THE INVENTION

Hereinafter, exemplary embodiments of the present invention will be described in detail. However, the present invention is not limited to the embodiments disclosed below, and can be implemented in various forms. The following embodiments are described in order to enable those of ordinary skill in the art to embody and practice the present invention.

EXAMPLE 1

Manufacture of Reflective Liquid Crystal Device (A1)

Figure 2:
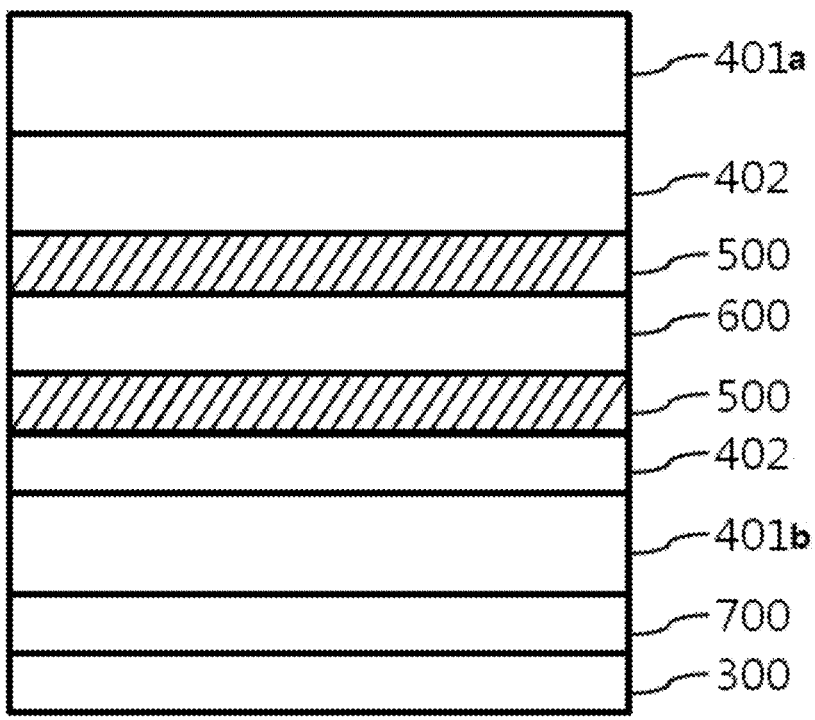
FIGS. 2 and 3 are schematic views showing a liquid crystal device according to one exemplary embodiment of the present invention.

A pretilt homeotropic alignment film having an pretilt angle of 86° was formed on a pair of polyethylene terephthalate (PET) films on which an indium tin oxide (ITO) transparent electrode layer was deposited, and then coated with a composition for forming a guest-host liquid crystal layer (including a liquid crystal compound (HCM009 commercially available from HCCH) and an anisotropic dye (X12 commercially available from BASF) at a weight ratio of 100:1) to form a guest-host liquid crystal layer. Thereafter, a quarter-wave plate having an optical axis formed at an angle of approximately 45° with respect to an optical axis of the liquid crystal compound in the liquid crystal layer which was horizontally aligned when an external electric field was applied was formed on a surface of the PET film on which no transparent electrode layer was formed, and a reflective plate was additionally positioned on an opposite surface of a surface of the quarter-wave plate at which the guest-host liquid crystal layer existed, thereby manufacturing a reflective liquid crystal device (A1) having the same structure as shown in FIG. 2.

EXAMPLE 2

Manufacture of Reflective Liquid Crystal Device (A2)

A reflective liquid crystal device (A2) was manufactured in the same manner as in Example 1, except that a guest-host liquid crystal layer was formed using a guest-host liquid crystal composition (including a liquid crystal compound (HCM009 commercially available from HCCH) and an anisotropic dye (X12 commercially available from BASF) at a weight ratio of 100:0.7.

EXAMPLE 3

Manufacture of Reflective Liquid Crystal Device (A3)

Figure 3:
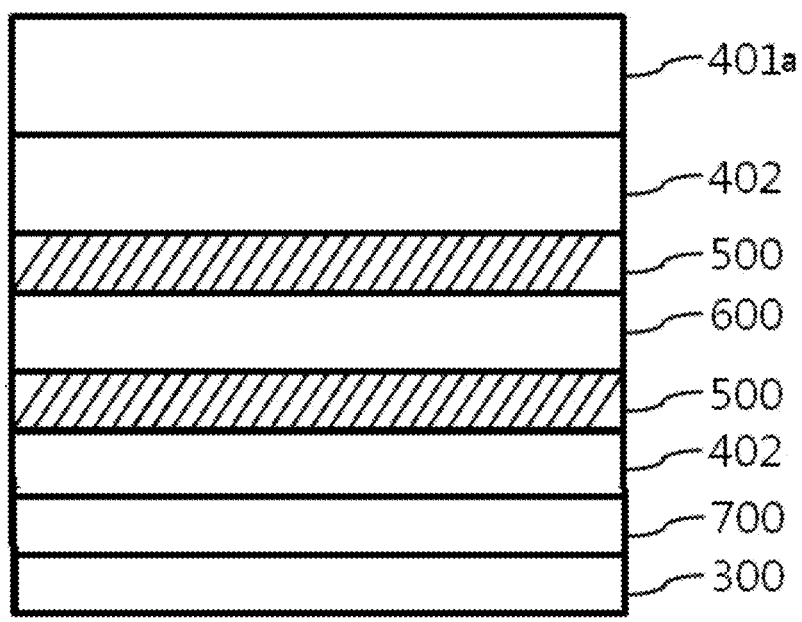
Figure 4:
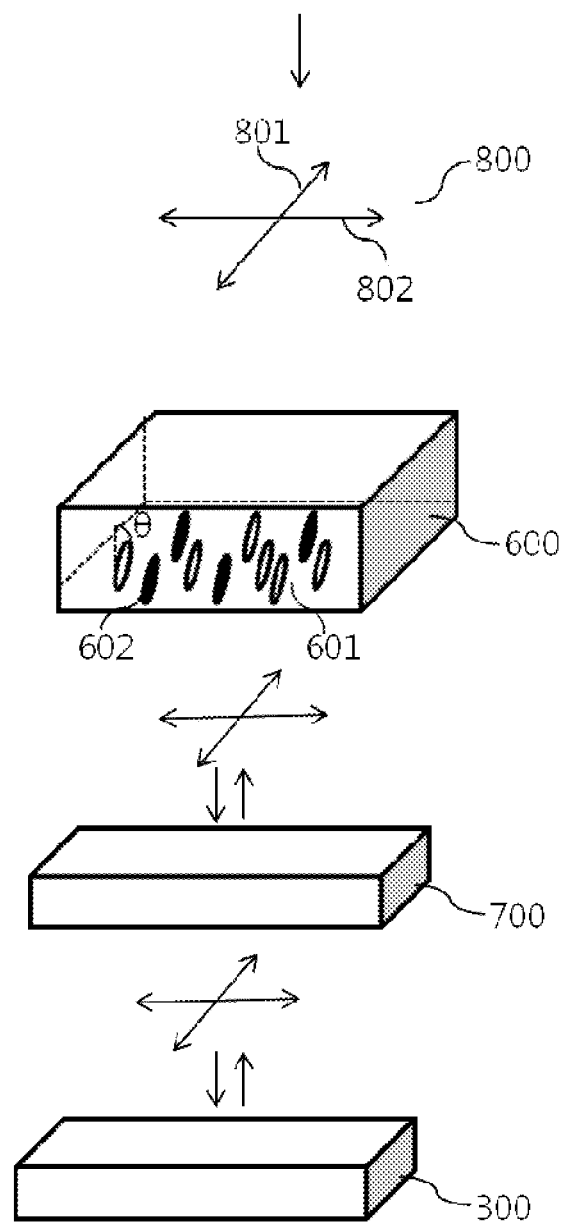
FIGS. 4 and 5 are diagrams showing an operation principle of the liquid crystal device according to one exemplary embodiment of the present invention.
Figure 5:
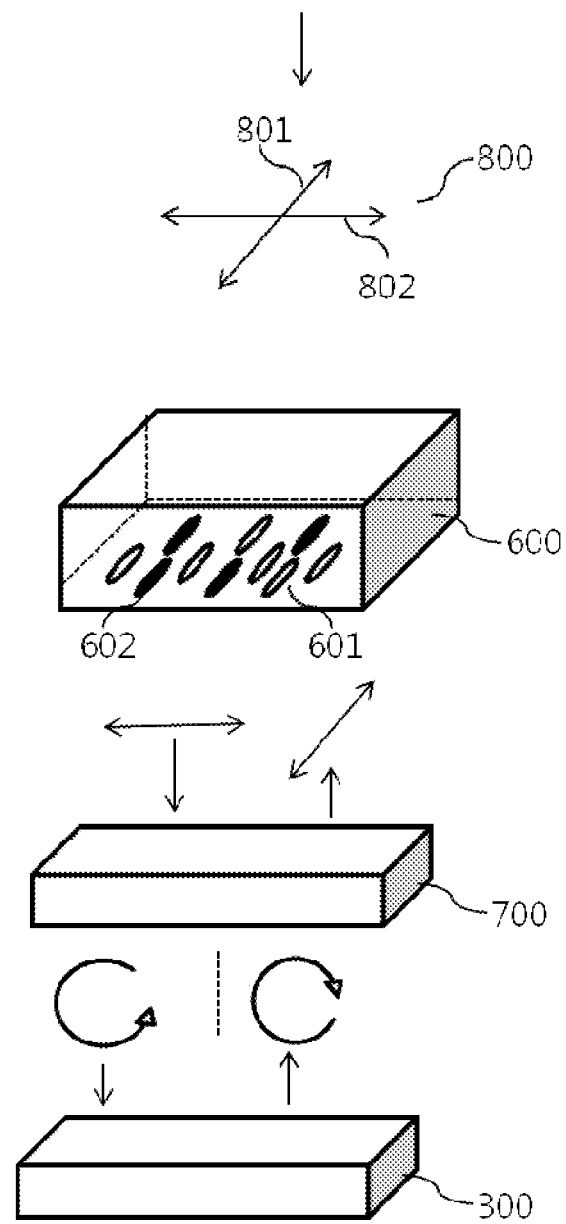

A reflective liquid crystal device (A3) was manufactured in the same manner as in Example 1, except that the reflective liquid crystal device having the same structure as shown in FIG. 3 was manufactured using only one PET film.

COMPARATIVE EXAMPLE 1

Reflective Liquid Crystal Device (B1) Including no Quarter-Wave Plate

A reflective liquid crystal device (B1) was manufactured in the same manner as in Example 1, except that the reflective liquid crystal device having a structure in which no quarter-wave plate was present in the structure as shown in FIG. 2 was manufactured.

COMPARATIVE EXAMPLE 2

Reflective Liquid Crystal Device (B2) Including Angle-Adjusted Quarter-Wave Plate A reflective liquid crystal device (B2) was manufactured in the same manner as in Example 1, except that a quarter-wave plate having an optical axis formed at an angle of approximately 20° with respect to an optical axis of the liquid crystal compound which was horizontally aligned when an external electric field was applied was formed.

EXPERIMENTAL EXAMPLE

Measurement of Reflection Rate

Reflectances of the liquid crystal devices manufactured in Examples and Comparative Examples were measured when an electric field was not applied and when an electric field was applied.

Specifically, the reflectances of the liquid crystal devices manufactured in Examples and Comparative Examples compared to the reflectance of the reflective plate when an electric field was not applied and when an electric field was applied were measured under a D65 light source using a spectrum colorimeter (CM-2500d commercially available from Konica Minolta Co., Ltd.)., and then converted into percentages. In this case, the external electric field applied was 30V.

TABLE 1

|  | Examples | | | Comparative Examples | |
|---|---|---|---|---|---|
|  | 1 | 2 | 3 | 1 | 2 |
| Reflectance (%) upon application of no electric field | 60 | 69 | 62 | 53 | 60 |
| Reflectance (%) upon application of electric field | 11 | 23 | 11 | 32 | 20 |

What is claimed is:

1. A reflective liquid crystal device comprising:
   a first substrate layer;
   a first electrode layer disposed below the first substrate layer;
   a first pretilt homeotropic alignment film disposed below the first electrode layer;
   a guest-host liquid crystal layer comprising a liquid crystal compound and a dichroic dye, and disposed below the first pretilt homeotropic alignment film;
   a second pretilt homeotropic alignment film disposed below the guest-host liquid crystal layer;
   a second electrode layer disposed below the second pretilt homeotropic alignment film;
   a second substrate layer disposed below the second electrode layer;
   a quarter-wave plate disposed below the second substrate layer; and
   a reflective plate disposed below the quarter-wave plate,
   wherein an optical axis of the quarter-wave plate is formed at an angle of 40° to 50° with respect to an optical axis of the liquid crystal compound included in the horizontally aligned guest-host liquid crystal layer when an external electric field is applied,
   wherein the thicknesses of the guest-host liquid crystal layer, the first and second substrate layers and the first and second electrode layers satisfy the following Equation 1:

$$0.015 < b/a < 0.6 \quad \text{[Equation 1]}$$

wherein b represents a thickness of the guest-host liquid crystal layer, and a represents the sum of thicknesses of the first and second substrate layers and the first and second electrode layers, and wherein the reflective liquid crystal device satisfies the following Equation 2:

$$A - B > 40\% \quad \text{[Equation 2]}$$

wherein A represents a reflectance in a state in which an external electric field is not applied, and B represents a reflectance in a state in which an external electric field is applied.

2. The reflective liquid crystal device of claim 1, wherein the liquid crystal compound is an N-type nematic liquid crystal compound.

3. The reflective liquid crystal device of claim 1, wherein the guest-host liquid crystal layer comprises the dichroic dye at 0.3 to 3 parts by weight, based on 100 parts by weight of the liquid crystal compound.

4. The reflective liquid crystal device of claim 1, wherein a pretilt angle of the liquid crystal compound included in the guest-host liquid crystal layer is in a range of 70° to 90° in a state in which an external electric field is not applied.

5. The reflective liquid crystal device of claim 1, wherein the guest-host liquid crystal layer has a thickness ranging from 3 μm to 30 μm.

6. The reflective liquid crystal device of claim 1, wherein the pretilt homeotropic alignment film is a rubbing alignment film or an optical alignment film.

7. The reflective liquid crystal device of claim 1, which is maintained in a transmission mode such that the reflective liquid crystal device has a reflectance of 30% or more in a state in which an external electric field is not applied.

8. The reflective liquid crystal device of claim 1, which is maintained in a block mode such that the reflective liquid crystal device has a reflectance of less than 30% in a state in which an external electric field is applied.

9. The reflective liquid crystal device of claim 1, which is realized in a transparent mode such that the reflective liquid crystal device has a haze of less than 10% in a state in which an external electric field is applied.

10. A mirror comprising the reflective liquid crystal device defined in claim 1.

* * * * *